US010896185B1

(12) United States Patent
Namjoshi et al.

(10) Patent No.: US 10,896,185 B1
(45) Date of Patent: Jan. 19, 2021

(54) MODEL VALIDATION FOR QUERY INTENT

(71) Applicant: Workday, Inc., Pleasanton, CA (US)

(72) Inventors: Parag Avinash Namjoshi, Foster City, CA (US); Harikrishna Narayanan, Alameda, CA (US); Hamdi Jenzri, Alameda, CA (US); Adam Charles Baker, San Francisco, CA (US)

(73) Assignee: Workday, Inc., Pleasanton, CA (US)

( * ) Notice: Subject to any disclaimer, the term of this patent is extended or adjusted under 35 U.S.C. 154(b) by 299 days.

(21) Appl. No.: 15/966,240

(22) Filed: Apr. 30, 2018

(51) Int. Cl.
*G06F 16/2457* (2019.01)
*G06N 7/00* (2006.01)
*G06F 16/28* (2019.01)
*G06F 16/2453* (2019.01)

(52) U.S. Cl.
CPC .... *G06F 16/24575* (2019.01); *G06F 16/2453* (2019.01); *G06F 16/24578* (2019.01); *G06F 16/285* (2019.01); *G06N 7/00* (2013.01)

(58) Field of Classification Search
None
See application file for complete search history.

(56) References Cited

U.S. PATENT DOCUMENTS

| | | | |
|---|---|---|---|
| 10,327,098 B1 * | 6/2019 | Jamkhedkar | H04W 4/021 |
| 10,417,687 B1 * | 9/2019 | Reel | G06F 16/9535 |
| 10,750,315 B2 * | 8/2020 | Jamkhedkar | G06Q 20/4014 |
| 2017/0193115 A1 * | 7/2017 | Wan | G06F 16/951 |
| 2019/0098037 A1 * | 3/2019 | Shenoy, Jr. | H04L 63/105 |
| 2019/0335295 A1 * | 10/2019 | Jamkhedkar | H04W 4/021 |

\* cited by examiner

*Primary Examiner* — Kim T Nguyen
(74) *Attorney, Agent, or Firm* — Van Pelt, Yi & James LLP (57) ABSTRACT

A system for improving a query response includes an interface and a processor. The interface is configured to receive a query. The processor is configured to determine a categorization for the query using a model. The categorization is associated with a confidence value. The processor is configured to determine whether the confidence value is above a first threshold and, in response to the confidence value being above the first threshold, modify the query response based at least in part on the categorization.

17 Claims, 11 Drawing Sheets

MODEL VALIDATION FOR QUERY INTENT

BACKGROUND OF THE INVENTION

One technique for improving search results from a search engine is to parse the search query to determine a query intent and to perform the search with knowledge of that query intent. The query is parsed to determine a query categorization—for example, what type of word the query is. Different searches can be run for different categorizations, results can be filtered based on the categorization, etc. In order for the categorization to be useful, it must be precise (e.g., the model should only indicate a categorization in the event that it has a high confidence the categorization is correct). A search on text characterized as a name or on text characterized as a name of a business will provide very different results (e.g., 'Charles Schwab' as a name versus as a company). Training a model for determining a query categorization requires a very large amount of data and typically creating custom models (e.g., based on a specific data set) is not possible. Utilizing a model for a multi-tenant database system can be difficult because each tenant has very different data and the accuracy and utility of the model can vary between tenants. Accuracy of the model for tenants of the multi-tenant database system cannot be determined or affected manually by a system administrator because both the query and documents are tenanted data, hence private and not accessible to the administrator. This creates a problem wherein the model must be automatically verified and calibrated for each tenant.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for improving a query response comprises an interface configured to receive a query, and a processor configured to determine a categorization for the query using a model, wherein the categorization is associated with a confidence value, determine whether the confidence value is above a first threshold, and in response to the confidence value being above the first threshold, modify the query response based at least in part on the categorization. The system for improving a query response additionally comprises a memory coupled to the processor and configured to provide the processor with instructions.

A system for improving a query response utilizes a categorization model to provide a categorization for a query. The categorization model receives a query from a query system, determines a categorization and an associated confidence value for the query, and provides the categorization and the confidence value for the query to the query engine. The system for improving a query response comprises a system for determining and using a confidence threshold for determining when to accept a categorization from the categorization model. The system automatically calibrates a confidence threshold, based on tenant data, for each provided categorization, for each tenant of a set of tenants.

The system for improving a query response determines a set of thresholds for a tenant by accessing a set of categorized tenant data (e.g., a set of structured documents stored in the system, whose individual fields segregate data from different categories). The system for improving a query response formulates synthetic queries combining data from these structured documents, executes them against the model, and receives a categorization and a confidence value from the model for the query. Since the query is synthetic (though based on real data from tenant), it is precisely known how it should be categorized and the model's categorization and confidence values can be compared against the known true categorization. For a given categorization, a threshold indicates the required confidence value for the system to label a query with that threshold. As the threshold ranges from a minimum confidence value (e.g., all queries for which the model returns the categorization are labeled with it) to a maximum confidence value (e.g., only queries for which the model returns the categorization with maximum confidence are labeled with it), the system false positives go down (e.g., fewer queries are labeled incorrectly) and the system false negatives go up (e.g., more queries are incorrectly not labeled). A threshold can be chosen based on a desired tradeoff between the importance of false positives and false negatives. The system for improving a query response determines a first threshold based on maximizing an $F_{0.1}$ metric, giving 10 times the importance to false positives as false negatives. Consequently, categorizations above the first threshold have very high chance of being accurate and can be used for precise targeting of search to appropriate field. A second threshold is chosen based on maximizing an $F_1$ metric, giving equal importance to false positives and false negatives. Categorizations above the second threshold, while less targeted, still allow for improved ranking of search results.

The system for improving a query response comprises a system for performing a query based at least in part on a categorization. The system receives a query and determines a categorization for the query using a model, wherein the categorization is associated with a confidence value. The system then determines whether the confidence value is above the first threshold. In the event the categorization is above the first threshold (e.g., in the event the model confidence of the threshold is very high), the system modifies the query response based at least in part on the categorization. For example, the system filters the query results to only include results associated with the categorization. In the event the categorization is above the second threshold and not above the first threshold, the system modifies the query response based at least in part on the categorization. For example, the system boosts the query ranking of query results associated with the categorization.

The system for improving a query response improves the computing system by automatically determining and using confidence value thresholds based on private tenant data in order to make most effective use of a global (e.g., non-tenanted, public, non-customizable, etc.) categorization model. For example, a threshold for users of a tenant associated with a software company would make a search on the term 'Python' more likely associated with the category software language, whereas users of a tenant associated with a veterinary school would make a search on the same term more likely associated with the category reptile.

Figure 1:
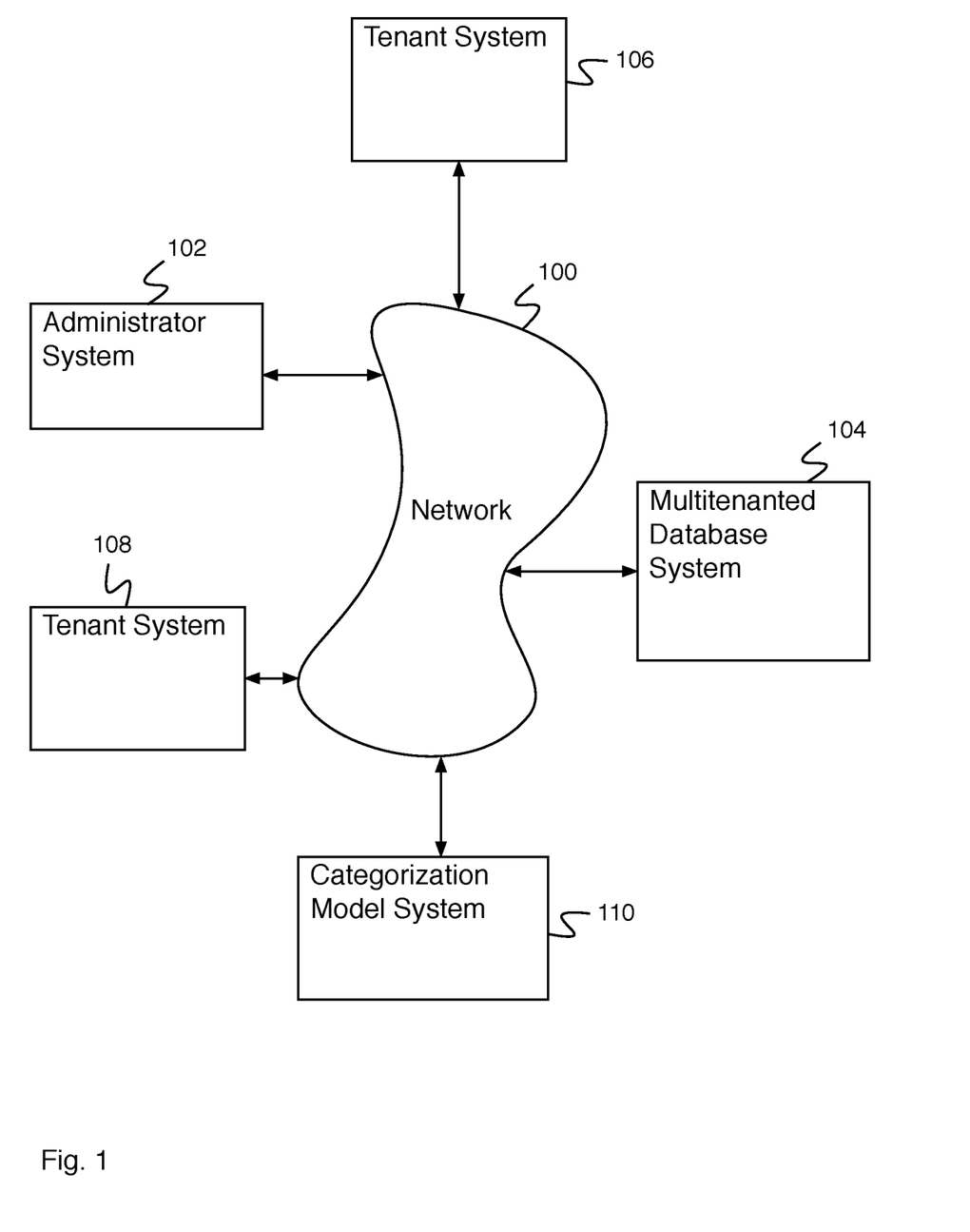
FIG. 1 is a block diagram illustrating an embodiment of a network system.

FIG. 1 is a block diagram illustrating an embodiment of a network system. In some embodiments, the network system of FIG. 1 comprises a network system for a system for model validation for query intent. In the example shown, tenant system 106 and tenant system 108 store data on separate tenanted areas of multitenanted database system 104. Multitenanted database system 104 comprises a plurality of tenanted areas, each associated with a tenant comprising one or more tenant systems. Data stored in a tenanted area is only accessible to users and systems associated with the tenant and is not accessible to users or systems associated with other tenants or to administrators associated with multitenanted database system 104 (e.g., administrators accessing multitenanted database system 104 via administrator system 102). Administrator system 102 is able to administrate different components of the system including multitenanted database system 104.

In the example shown, FIG. 1 comprises network 100. In various embodiments, network 100 comprises one or more of the following: a local area network, a wide area network, a wired network, a wireless network, the Internet, an intranet, a storage area network, or any other appropriate communication network. Administrator system 102, multitenanted database system 104, tenant system 106, and tenant system 108 communicate via network 100. Administrator system 102 comprises an administrator system for use by an administrator. Administrator system 102 comprises an administrator system for executing administrator commands, for configuring multitenanted database system 104, etc. Multitenanted database system 104 comprises a database system for providing tenant user access to data stored in a tenanted area of multitenanted database system 104 (e.g., access to add data, view data, modify data, delete data, access reports, execute business processes, etc.). Tenant system 106 and tenant system 108 comprise tenant systems for use by tenant users. A tenant user uses a tenant system to interact with multitenanted database system 104, for example to store database data, to request database data, to request reporting based on database data, to request creation of a model based on database data, to use a model based on database data, etc. In some embodiments, the network system of FIG. 1 comprises a plurality of tenant systems associated with one or more tenants.

The network system of FIG. 1 additionally comprises categorization model system 110. One or more of administrator system 102, multitenanted database system 104, tenant system 106, and tenant system 108 communicate with categorization model system 110 via network 100. Categorization model system 110 comprises a system for a categorization model. For example, categorization model system 110 comprises a system for receiving a query, determining a categorization for the query using a categorization model, and providing the categorization in response to the query. When appropriate, the categorization model additionally provides a confidence value associated with the categorization. In some embodiments, categorization model system 110 comprises part of multitenanted database system 104. In some embodiments, categorization model system 110 comprises an external system (e.g., a system created and/or owned by a different entity, an external system accessed via the Internet, etc.).

A tenant user uses a tenant system to provide an indication to multitenanted database system 104 to perform a query. Multitenanted database system 104 receives the query and determines a categorization for the query using a model (e.g., by providing the query to categorization model system 110 and receiving a categorization for the query from categorization model system 110), wherein the categorization is associated with a confidence value. For example, multitenanted database system processes the query using a tenant system of a set of tenant systems. Multitenanted database system 104 submits the query to a search engine (e.g., to determine a query response—for example, a set of search results). Multitenanted database system 104 determines whether the confidence value is above a first threshold, and in response to the confidence value being above the first threshold, modifies the query response based at least in part on the categorization. For example, multitenanted database system 104 filters the query response using the categorization (e.g., removes any search results from the query response that are not associated with the categorization).

In response to the confidence value being below the first threshold, multitenanted database system 104 determines whether the confidence value is above a second threshold, and in response to the confidence value being above the second threshold and below the first threshold, modifies the query response based at least in part on the categorization. For example, multitenanted database system 104 boosts the query responses associated with the categorization (e.g., raises the search rank of any search results from the query response associated with the categorization). So, a ranking of a search result for 'Python" gets a boost in the search results if it is categorized as likely belonging to a software category and the user is associated with a software company's tenant.

Figure 2:
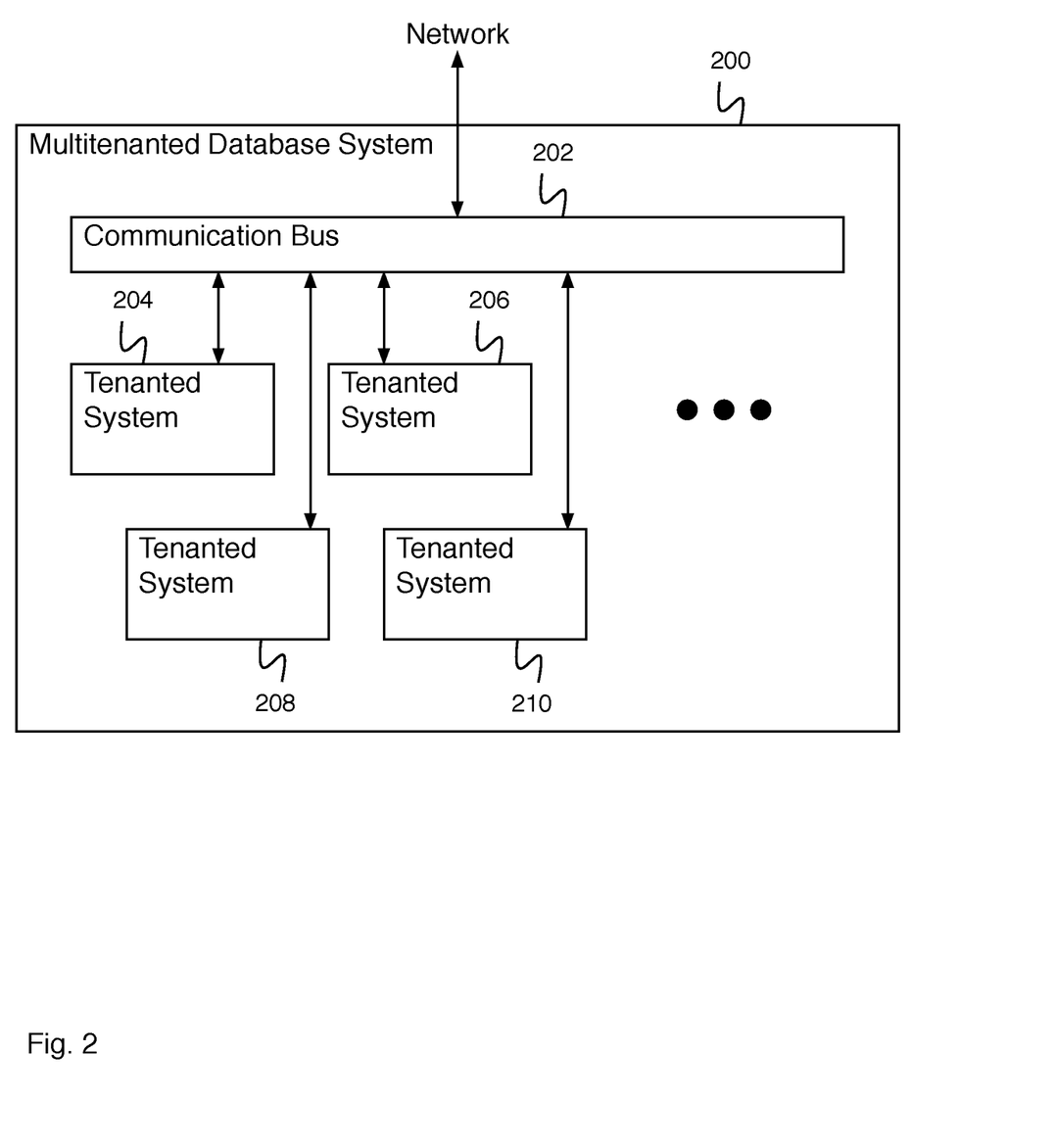
FIG. 2 is a block diagram illustrating an embodiment of a multitenanted database system.

FIG. 2 is a block diagram illustrating an embodiment of a multitenanted database system. In some embodiments, multitenanted database system 200 comprises multitenanted database system 104 of FIG. 1. In the example shown, multitenanted database system 200 comprises communication bus 202 and a plurality of tenanted systems (e.g., tenanted system 204, tenanted system 206, tenanted system 208, and tenanted system 210). Multitenanted database system comprises any appropriate number of tenanted systems (e.g., 1 tenanted system, 2 tenanted systems, 12 tenanted systems, 122 tenanted systems, 1543 tenanted systems, etc.). Communication bus 202 comprises a communication bus for allowing each of the tenanted systems to communicate with a network (e.g., with network 100 of FIG. 1). In some embodiments, communication bus 202 does not allow tenanted systems of multitenanted database system 200 to communicate with each other. Each tenanted system of multitenanted database system 200 comprises a system for automatic model release for building tenanted models based on tenanted data.

Multitenanted database system 200 receives a query (e.g., from a tenant user using a tenant system). Communication bus 202 provides the query to the appropriate tenanted system of the plurality of tenanted systems.

The tenanted system (e.g., tenated system 204, tenated system 206, tenated system 208, or tenanted system 210) receives the query. The tenated system provides the query to a categorization model system via communication bus 202 that determines a categorization for the query using a model (e.g., using a categorization model). The categorization model system returns the categorization along with a confidence value also via communication bus 202. The tenanted system submits the query to a search engine (e.g., to determine a query response—for example, a set of search results). The tenanted system determines whether the confidence value is above a first threshold, and in response to the confidence value being above the first threshold, modifies the query response based at least in part on the categorization. For example, the tenanted system filters the query response using the categorization (e.g., removes any search results from the query response that are not associated with the categorization). So, a search result for 'Python" gets removed from the search results if it is categorized as likely belonging to a software category and the user is associated with a tenant associated with a veterinary tenant.

In response to the confidence value being below the first threshold, the tenanted system determines whether the confidence value is above a second threshold, and in response to the confidence value being above the second threshold and below the first threshold, modifies the query response based at least in part on the categorization. For example, the tenanted system boosts the query responses associated with the categorization (e.g., raises the search rank of any search results from the query response associated with the categorization). The tenanted system then provides the results of the search via communication bus 202 to the tenant user that originally submitted the query.

Figure 3:
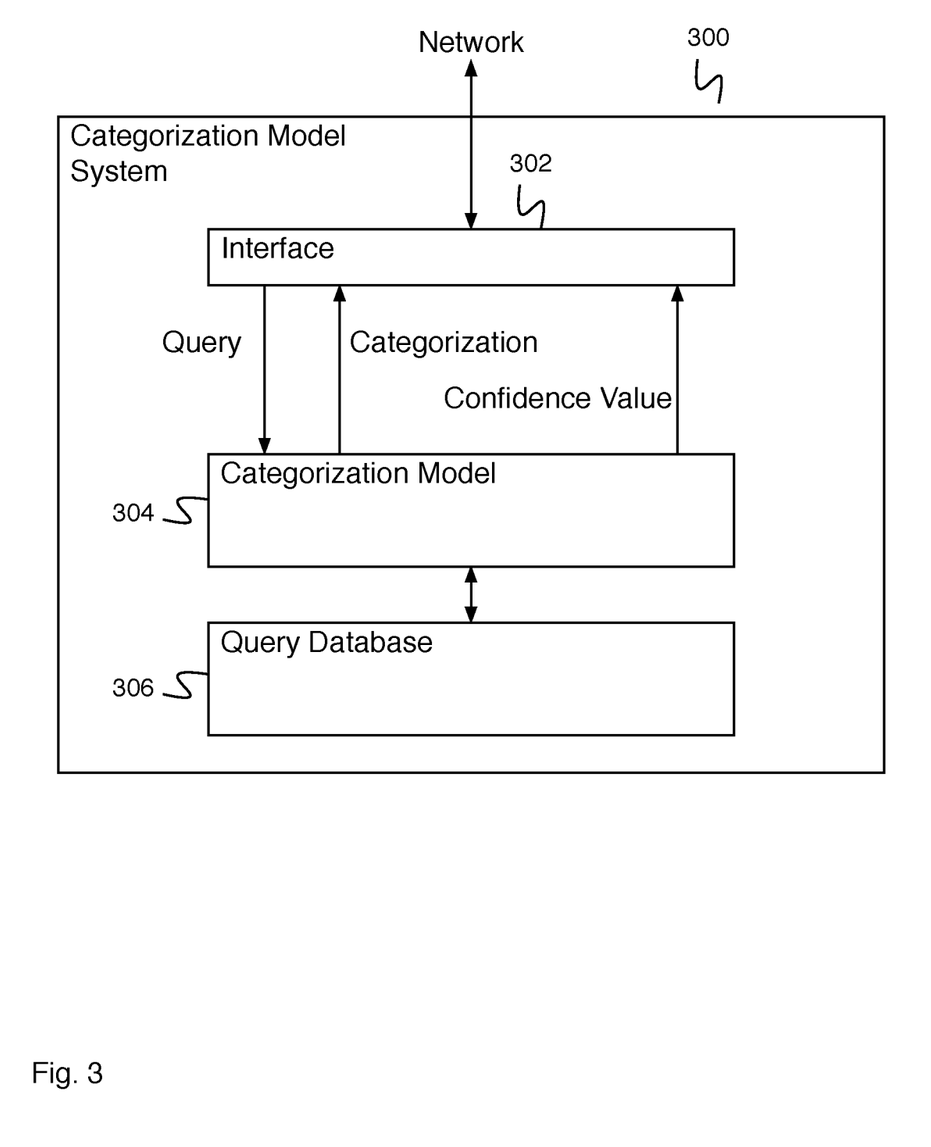
FIG. 3 is a block diagram illustrating an embodiment of a categorization system.

FIG. 3 is a block diagram illustrating an embodiment of a categorization system. In some embodiments, categorization model system 300 comprises categorization model system 110 of FIG. 1. In the example shown, categorization model system 300 communicates with a network using interface 302. For example, categorization model system 300 communicates with a network to receive a query and to provide a query categorization or a query categorization confidence value. Categorization model 304 receives a query and determines a categorization and a confidence value for the query. Categorization model 304 has access to and/or is trained using query database 306. Query database 306 comprises a database of queries and associated categorizations.

A tenanted system (e.g., a tenanted system of a multitenanted database system) receives a query and provides the query to categorization model system 300. Categorization model system 300 provides the query to categorization model 304, which determines a categorization and an associated confidence value, and provides the categorization and associated confidence value (e.g., via interface 302) to the tenanted system.

The tenanted system determines whether the received confidence value from categorization model system 300 is above a first threshold, and in response to the confidence value being above the first threshold, modifies the query response based at least in part on the categorization. For example, the tenanted system filters the query response using the categorization (e.g., removes any search results from the query response that are not associated with the categorization).

In response to the confidence value being below the first threshold, the tenanted system determines whether the confidence value is above a second threshold, and in response to the confidence value being above the second threshold and below the first threshold, modifies the query response based at least in part on the categorization. For example, the tenanted system boosts the query responses associated with the categorization (e.g., raises the search rank of any search results from the query response associated with the categorization).

Figure 4:
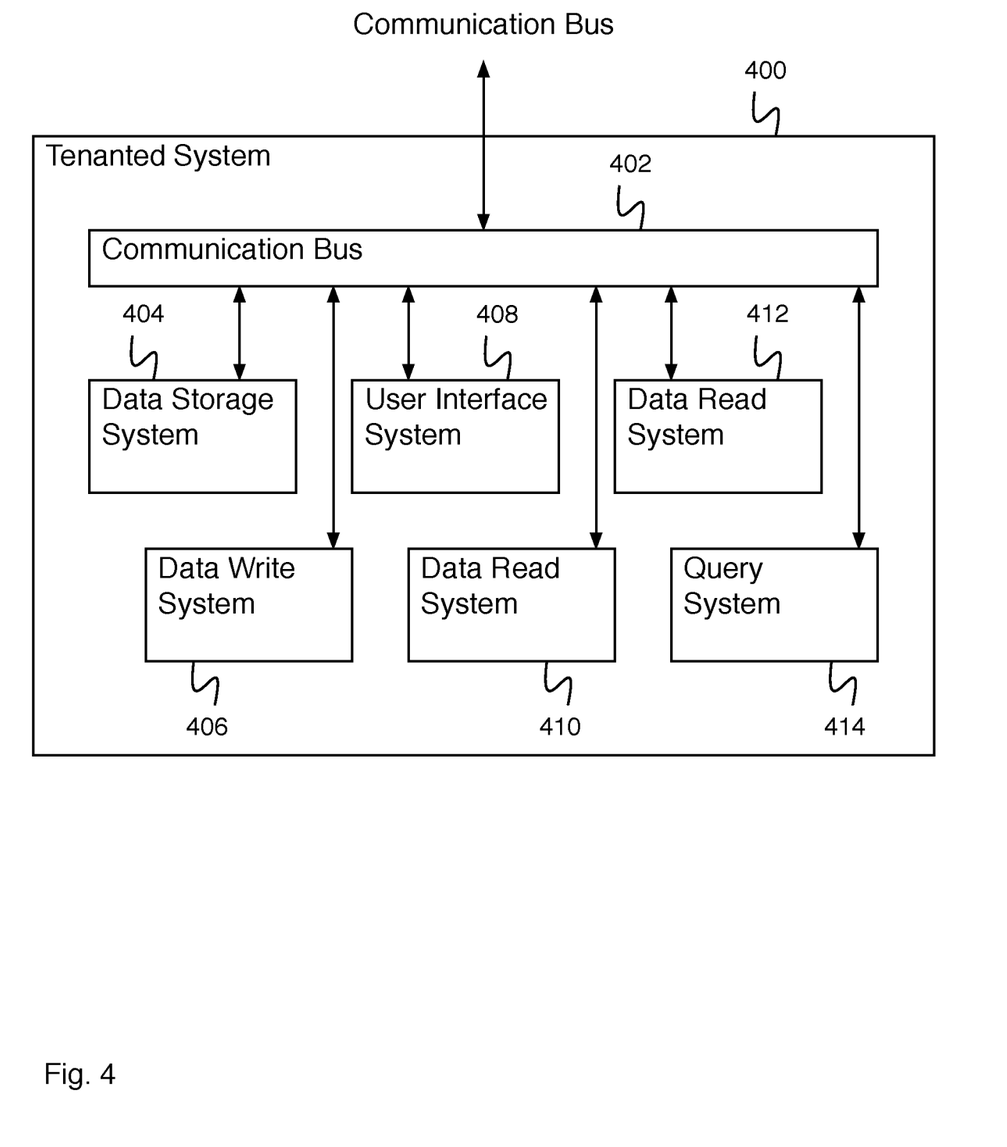
FIG. 4 is a block diagram illustrating an embodiment of a tenanted system.

FIG. 4 is a block diagram illustrating an embodiment of a tenanted system. In some embodiments, tenanted system 400 of FIG. 4 comprises a tenanted system of FIG. 2 (e.g., tenanted system 204 of FIG. 2). In the example shown, tenanted system 400 comprises communication bus 402, data storage system 404, data write system 406, user interface system 408, data read system 410, data read system 412, and query system 414, Communication bus 402 comprises a communication bus for allowing each of the other systems of tenanted system 400 to communicate with an external communication bus (e.g., communication bus 202 of FIG. 2—for example, for communicating with a network system) and to communicate with each other. Data storage system 404 comprises a data storage system for storing tenant data. Data write system 406 comprises a system for performing write operations on tenant data stored by data storage system 404. For example, a write operation comprises a write lock operation, a data write operation, a data verify operation, and an unlock operation. A write lock operation locks the data storage system to prevent any other read or write operations from occurring while the write lock is in place. User interface system 408 comprises a user interface system for providing a user interface to a user (e.g., a user interface for reading data, writing data, executing applications, executing reporting, requesting a model, using a model, etc.). Data read system 410 and data read system 412 comprise systems for performing read operations on tenant data stored by data storage system 404. For example, a read operation comprises a read lock operation, a data read operation, and an unlock operation. A read lock operation locks the data storage system to prevent write operations from occurring while the read lock is in place. Multiple read operations can occur simultaneously. Tenanted system 400 comprises any appropriate number of data read systems (e.g., 1 data read system, 4 data read systems, 11 data read systems, etc.). Query system 414 comprises a system for performing a query. For example, query system 414 comprises a search engine. Query system 414 comprises a system for determining a query response, for modifying a query response (e.g., for modifying a query response based at least in part on a categorization), for determining a threshold, for determining whether a confidence associated with a query categorization is above a threshold, etc.

Tenanted system 400 receives a query from a user. For example, the query is received from a tenant user using a tenant system. Communication bus 402 receives the query and provides it to query system 414. Query system 414 receives the query and determines a categorization for the query using a model, wherein the categorization is associated with a confidence value. Query system 414 then determines whether the confidence value is above a threshold, and in response to the confidence value being over a threshold, modifies the query response based at least in part on the categorization. For example, query system 414 filters the query response using the categorization (e.g., removes any search results from the query response that are not associated with the categorization).

In response to the confidence value being below the first threshold, query system 414 determines whether the confidence value is above a second threshold, and in response to the confidence value being above the second threshold and below the first threshold, modifies the query response based at least in part on the categorization. For example, query system 414 boosts the query responses associated with the categorization (e.g., raises the search rank of any search results from the query response associated with the categorization).

Figure 5:
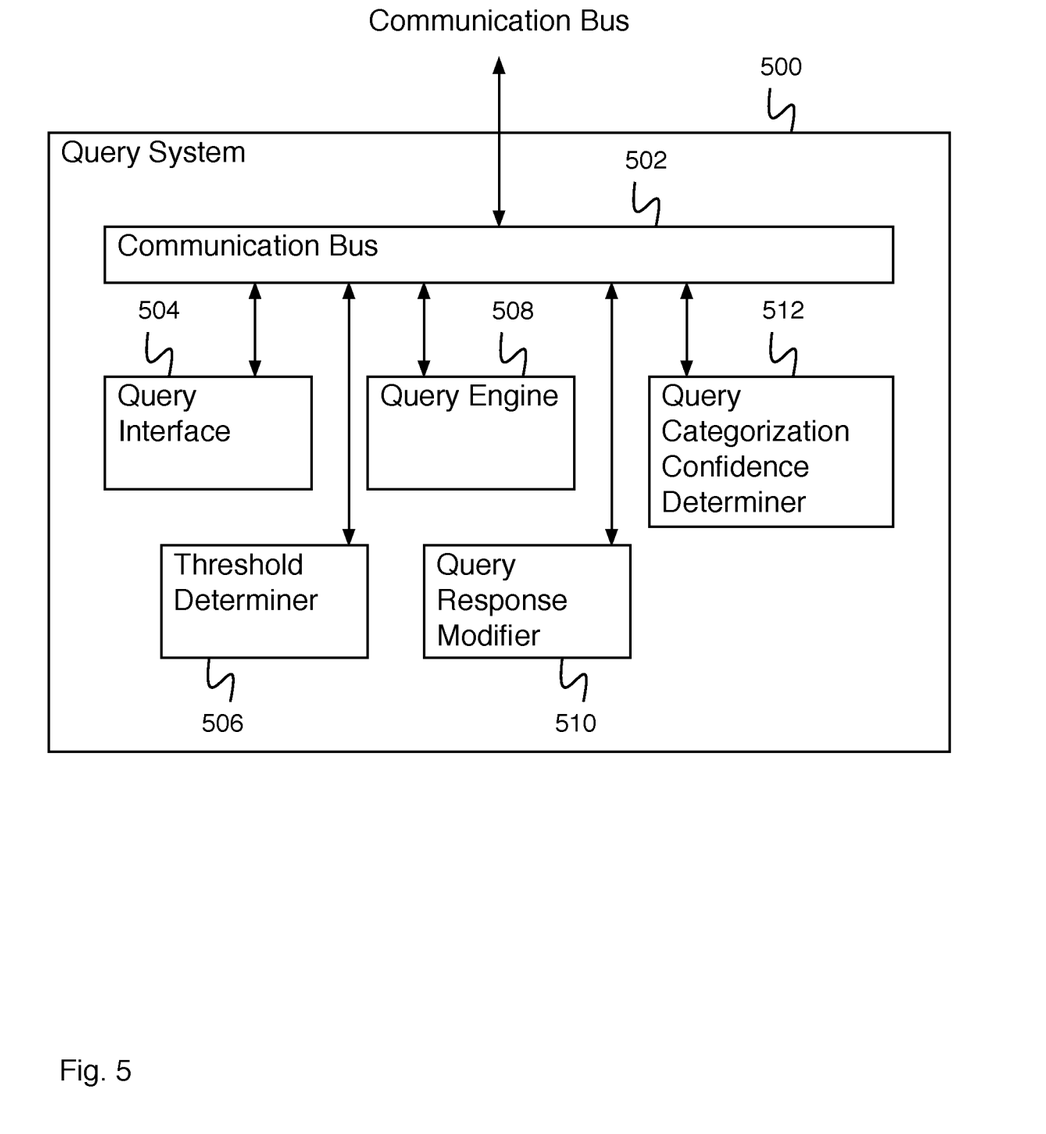
FIG. 5 is a block diagram illustrating an embodiment of a query system.

FIG. 5 is a block diagram illustrating an embodiment of a query system. In some embodiments, query system 500 comprises query system 414 of FIG. 4. In the example shown, query system 500 comprises communication bus 502, query interface 504, threshold determiner 506, query engine 508, query response modifier 510, and query categorization confidence determiner 512. Communication bus 502 comprises a communication bus for allowing each of the other systems of query system 500 to communicate with an external communication bus (e.g., communication bus 402 of FIG. 4—for example, for communicating with a network system) and to communicate with each other. Query interface 504 comprises an interface for receiving a query, interacting with a categorization model system, providing query results, etc. Threshold determiner 506 comprises a threshold determiner for determining a threshold (e.g., a query categorization confidence threshold). For example, threshold determiner 506 comprises a threshold determiner for determining one threshold, two thresholds, a threshold based at least in part on a precision, on a recall, on an $F_1$ metric, on an $F_{10}$ metric, on an $F_{0.1}$ metric, etc. Query engine 508 comprises a query engine for determining a query response (e.g., a ranked set of query response items that result from a search of structured documents). Query response items comprise data objects, data associated with categorization metadata, data references, hyperlinks, etc. Query response modifier 510 comprises a query response modifier for modifying a query response. For example, query response modifier 510 filters query responses based at least in part on a categorization, boosts query responses based at least in part on a categorization, modifies a query submitted to query engine 508 based at least in part on a categorization, etc. Query categorization confidence determiner 512 determines whether a query categorization confidence value is high enough to justify modification of a query response based on the query categorization. For example, query categorization confidence determiner 512 comprises a system for comparing a confidence value associated with a query categorization with a threshold.

Query system 500 receives a query from a user (e.g., from a tenant user using a tenant system). The query is communicated via communication bus 502 to query interface 504. Query interface 504 provides the query to a categorization model system and receives a categorization and an associated confidence value. Query categorization confidence determiner 512 compares the confidence value with a threshold determined by threshold determiner 506. Query interface 504 additionally provides the query to query engine 508. Query engine 508 determines a query response associated with the query. In the event query categorization confidence determiner 512 determines the query categorization is above a first threshold, query response modifier 510 modifies the query response—for example, query response modifier 510 filters the response for query response items (or search results) associated with the categorization. In the event query categorization confidence determiner 512 determines the query categorization is above a second threshold and below the first threshold, query response modifier 510 modifies the query response—for example, query response modifier 510 increases the search rank of query response items associated with the categorization.

Confidence values in the categorization model are calibrated per tenant. Real data from appropriate fields from structured documents are combined to create a synthetic query. Since the query is synthetic (though based on real data) it is precisely known how it should be categorized and model's categorization and confidence values can be compared with known true categorization. Confidence values corresponding to two thresholds (e.g., a first threshold and a second threshold) can then be set. When confidence values are above first (higher) threshold, only the specific fields of document are searched. For example, if a first part of the query is categorized to belong to field 1, and a second part of the query to field 5, only documents where field 1 matches the first part and field 5 matches the second part are returned, ignoring matches in other parts, resulting in a highly precise result set. When confidence values are above the second threshold, but under the first (higher) threshold, model's categorizations are used to boost matches from appropriate fields. For example, if query is categorized to belong to field 1 of a structured document, and the query matches two documents, one in field 1 and the other in field 5, the document matching field 1 will be ranked above the one which matches field 5. The categorizations can be probabilistic; the model may indicate that query has 2 parts, for the first part, there is a 60% chance that it belongs to field 1 and a 30% chance that it belongs to field 2, and second part has an 80% chance that it belongs to field 3 and a 15% chance it belongs to field 4. Then the document matching the first part to field 1 and the second part to field 3 will be ranked highest, followed by a document which matches the first part to field 2 and the second part to field 3, followed by a document which matches the first part to field 1 and the second part to field 4, followed by long tail of matches outside these four fields.

Figure 6:
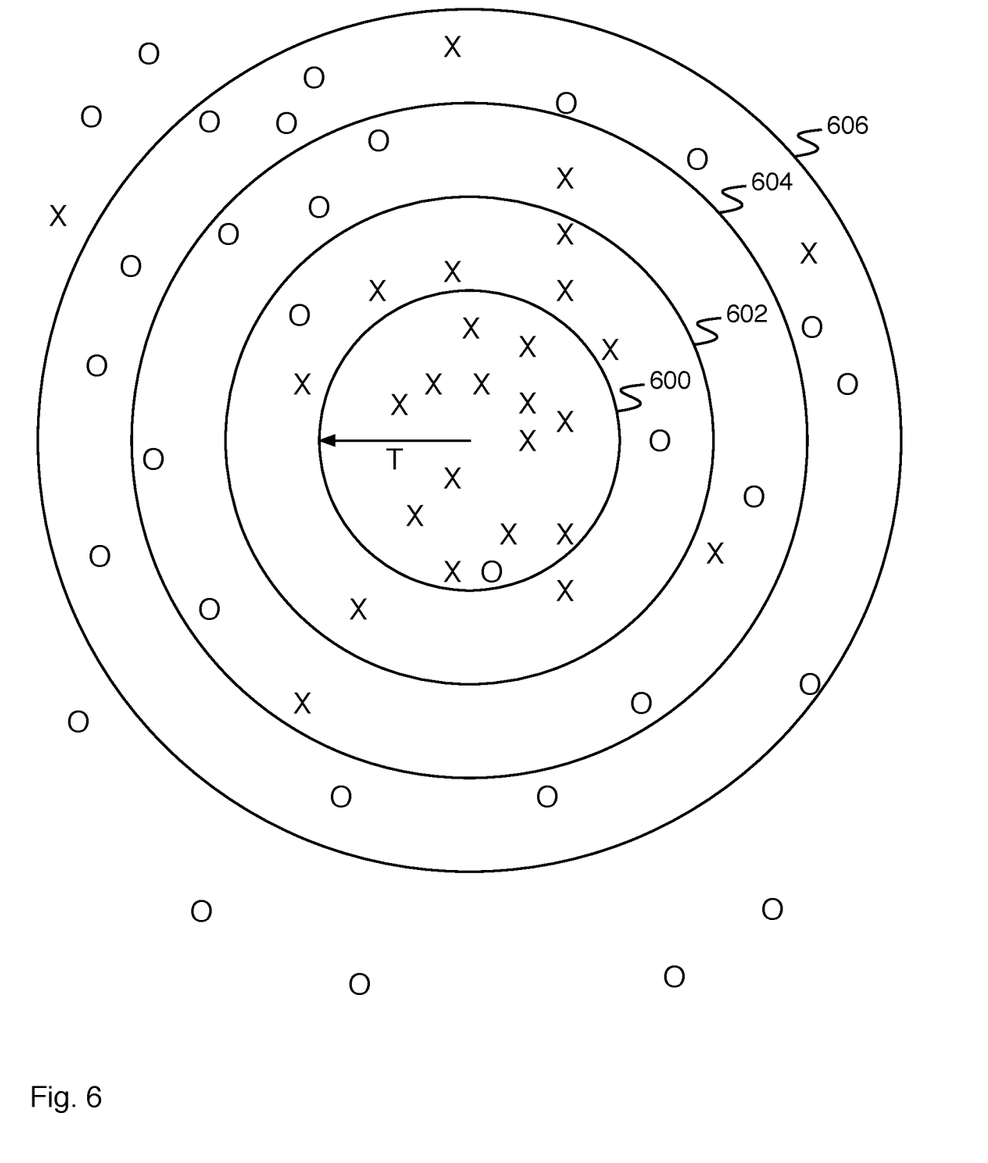
FIG. 6 is a diagram illustrating an embodiment of a classifier.

FIG. 6 is a diagram illustrating an embodiment of a classifier. In the example shown, the classifier of FIG. 6 comprises a circular threshold of radius T centered at a point. Four different classifiers are shown, comprising four different radii. Circle 600 is smallest, circle 602 is larger than circle 600, circle 604 is larger than circle 602, and circle 606 is largest. Circle 600, circle 602, circle 604, and circle 606 are concentric. A set of data points are scattered over the area of the classifiers, each data point represented by an X or an O. For example, an X represents a data measurement greater than a threshold, a positive determination, or another positive binary classification. An O represents a negative binary classification. In the example shown, X measurements are concentrated at the central point of the circles. Each classifier attempts to separate X measurements from O measurements, marking all measurements inside with an X and outside with an O. X measurements inside a circle are considered true positives and O measurements outside a circle are considered true negatives. X measurements outside a circle are considered false negatives (e.g., positive measurements that were marked as negative) and O measurements inside a circle are considered false positives (e.g., negative measurements that were marked as positive). As the circles go from smaller to larger, fewer false negatives occur but more false positives occur. A threshold can be chosen by maximizing a metric that takes both false positives and false negatives into account.

Figure 7A:
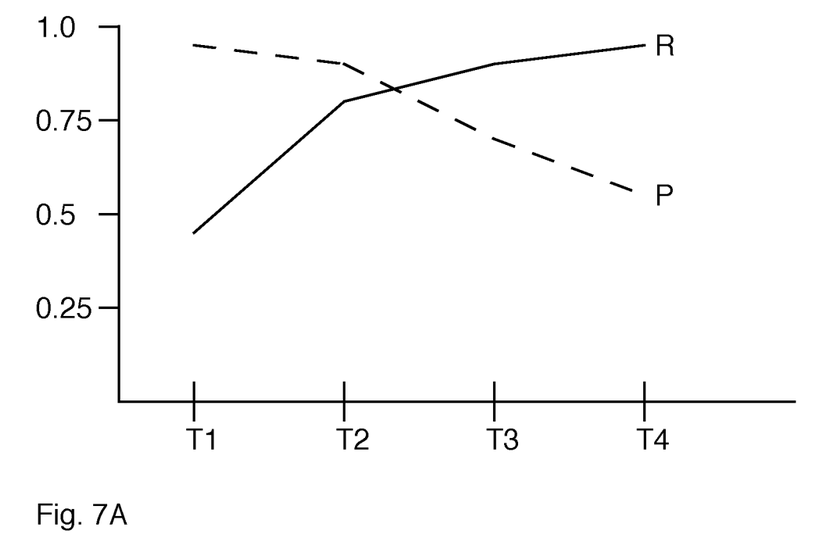
FIG. 7A is a diagram illustrating an embodiment of a precision and recall chart.

FIG. 7A is a diagram illustrating an embodiment of a precision and recall chart. In the example shown, the dashed line marked P corresponds to a precision measurement and the solid line marked R corresponds to a recall measurement. Precision and recall are shown for a classifier including four different thresholds. The classifier marked T1 comprises the classifier shown by circle 600 of FIG. 6. The classifier marked T2 comprises the classifier shown by circle 602 of FIG. 6. The classifier marked T3 comprises the classifier shown by circle 604 of FIG. 6. The classifier marked T4 comprises the classifier shown by circle 606 of FIG. 6. Precision comprises a measurement of how likely a measurement indicated to be true by the classifier is to actually be true, e.g., the number of true positives divided by the sum of the number of true positives and the number of false positives. Recall comprises a measurement of how likely the classifier finds a measurement that is true—for example, the number of true positives divided by the sum of the number of true positives and the number of false negatives. As the circles grow larger, precision goes down and recall goes up, crossing between the second and third circle.

Figure 7B:
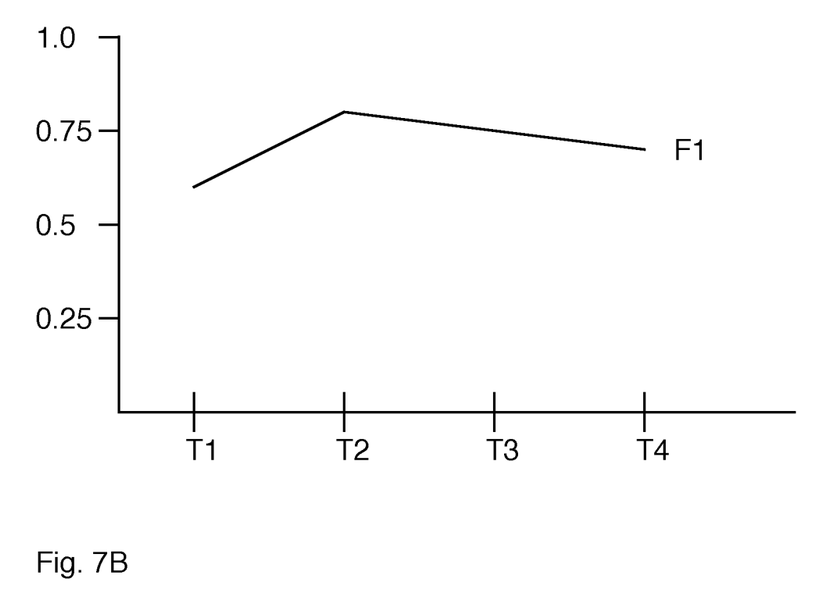
FIG. 7B is a diagram illustrating an embodiment of an $F_1$ metric chart.

FIG. 7B is a diagram illustrating an embodiment of an $F_1$ metric chart. In the example shown, the line marked F1 corresponds to an $F_1$ metric. The $F_1$ metric is shown for a classifier including four different thresholds. The classifier marked T1 comprises the classifier shown by circle 600 of FIG. 6. The classifier marked T2 comprises the classifier shown by circle 602 of FIG. 6. The classifier marked T3 comprises the classifier shown by circle 604 of FIG. 6. The classifier marked T4 comprises the classifier shown by circle 606 of FIG. 6. The $F_1$ metric comprises a metric based in part on precision and in part on recall (e.g., the harmonic mean of precision and recall). For example, the $F_1$ metric comprises $$2\frac{P*R}{P+R}.$$

The $F_1$ metric shows its highest value of the four thresholds at T2. In the event a threshold were to be chosen for the classifier from the four thresholds shown, to provide the best performance equally for precision and recall, T2 would be chosen. In the event an $F_1$ metric is measured for a higher granularity of thresholds, the optimal threshold would likely be near to where P and R cross—for example, just above T2.

The classifier can assign probabilities for parts of a query to belong to different categories. Using these probabilities, a most likely categorization is found and returned. This categorization is used as the model's categorization. Other, less likely categorizations can be used for boosting.

To define P and R, for simplicity, let's assume that we are trying to classify queries as either category 1, category 2 or category 3. If a query is categorized correctly as category 1, it is a "true positive" (tp) for category 1 and "true negative" (tn) for category 2 and category 3. On the other hand, if it is incorrectly categorized as category 2, it is still a "true negative" for category 3, but "false positive" (fp) for category 2 and "false negative" (fn) for category 1. Precision (P) is then calculated as usual:

$$\frac{tp}{tp+fp},$$

and Recall (R) as $$\frac{tp}{tp+fn}.$$

In some embodiments, other F metric calculations are used to determine a threshold. For example, a threshold can be determined based on a $F_{0.1}$ metric calculation, wherein $F_{0.1}$ comprises $$1.01\frac{P*R}{0.01P+R},$$

or a threshold can be determined based on a $F_{10}$ metric calculation, wherein $F_{10}$ comprises $$101\frac{P*R}{100P+R}.$$

Figure 8:
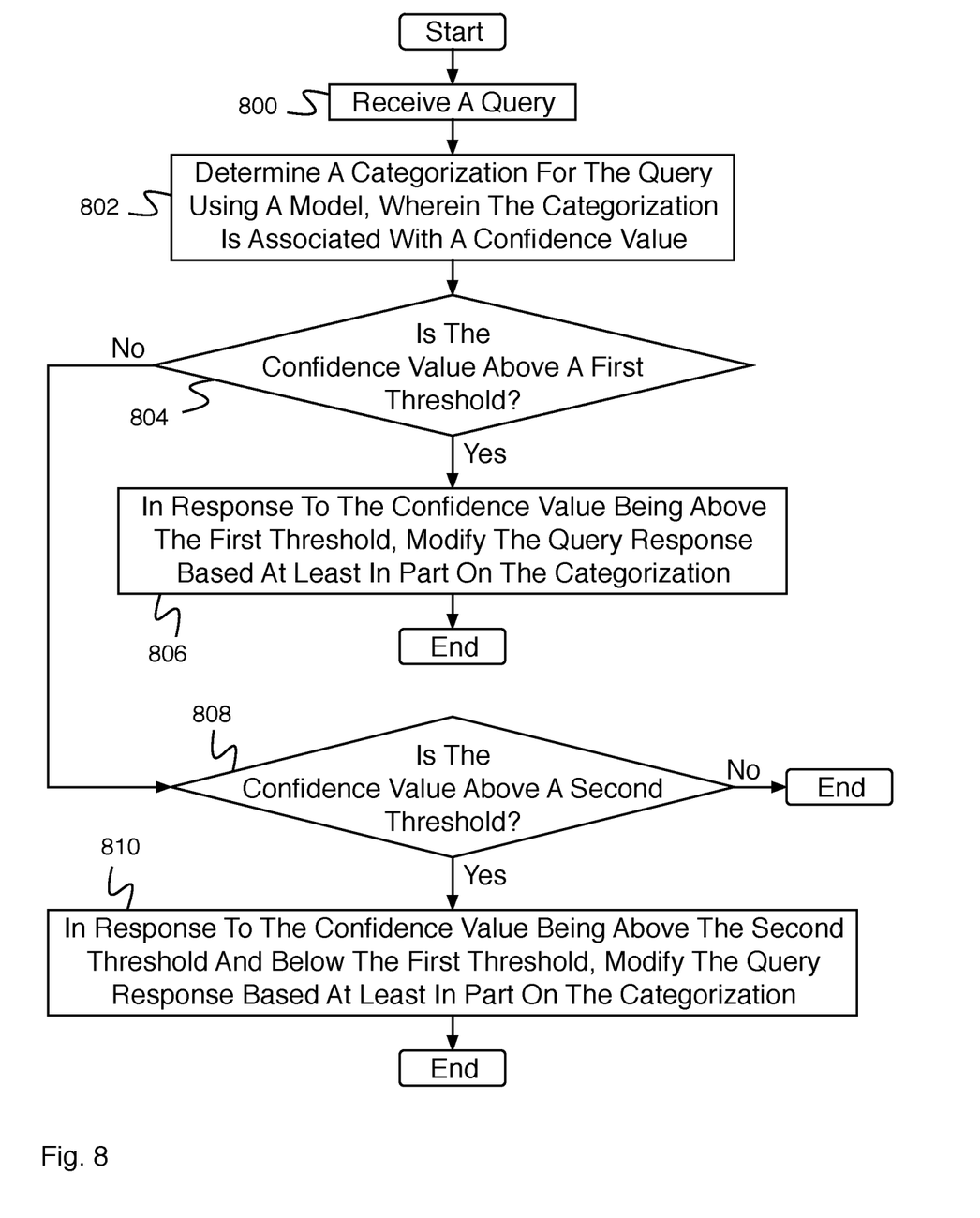
FIG. 8 is a flow diagram illustrating an embodiment of a process for improving a query response.

FIG. 8 is a flow diagram illustrating an embodiment of a process for improving a query response. In some embodiments, the process of FIG. 8 is executed by a query system (e.g., query system 500 of FIG. 5) of a tenanted system. In the example shown, in 800, a query is received. For example, a query is received from a tenant user using a tenant system. In 802, a categorization for the query is determined using a model, wherein the categorization is associated with a confidence value. For example, the categorization and confidence value are determined by using a model system of the query system, using an external model system, using a model service, etc. In 804, it is determined whether the confidence value is above a first threshold. For example, it is determined whether the confidence value is above a first threshold determined by a threshold determiner. For example, the first threshold is associated with the categorization and/or the tenant. In the event it is determined that the confidence value is above the first threshold, control passes to 806. In 806, in response to the confidence value being above the first threshold, a query response is modified based at least in part on the categorization. For example, the query response comprises a query response determined by a query engine in response to the query. For example, the query response is filtered to remove any query response items (or search results) not associated with the categorization. In some embodiments, modifying the query response based at least in part on the categorization comprises modifying the query submitted to a search engine using the categorization. The process then ends. In the event it is determined in 804 that the confidence value is not above the first threshold, control passes to 808. In 808, it is determined whether the confidence value is above a second threshold. For example, it is determined whether the confidence value is above a second threshold determined by a threshold determiner. For example, the second threshold is associated with the categorization. In the event it is determined that the confidence value is not above the second threshold, the process ends. In the event it is determined that the confidence value is above the second threshold, control passes to 810. In 810, in response to the confidence value being above the second threshold and below the first threshold, the query response is modified based at least in part on the categorization. For example, the query response is reranked using the categorization, responses associated with the categorization in the query response are raised in the ranking, etc.

Figure 9:
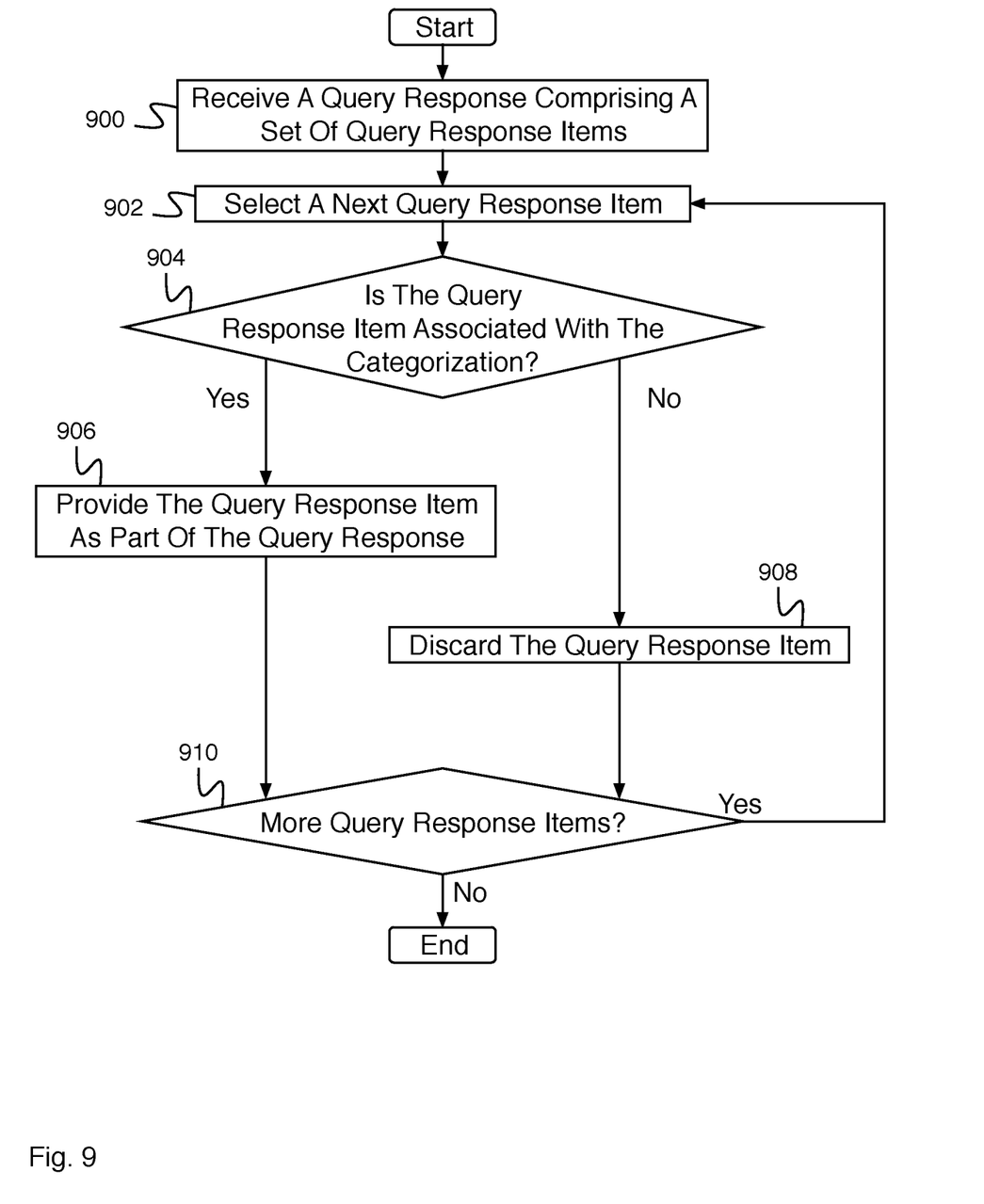
FIG. 9 is a flow diagram illustrating an embodiment of a process for modifying a query response based at least in part on a categorization.

FIG. 9 is a flow diagram illustrating an embodiment of a process for modifying a query response based at least in part on a categorization. In some embodiments, the process of FIG. 9 implements 806 of FIG. 8. In the example shown, in 900, a query response is received comprising a ranked set of query response items. For example, a ranked set of search results (or an ordered set of query response items) is received. In 902, a next query response item is selected. In some embodiments, the next query response item comprises the first query response item. In 904, it is determined whether the query response item is associated with the categorization. In the event it is determined that the query response item is associated with the categorization, control passes to 906. In 906, the query response item is provided as part of the query response. Control then passes to 910. In 904, in the event it is determined that the query response item is not associated with the categorization, control passes to 908. In 908, the query response item is discarded. In 910, it is determined whether there are more query response items. In the event it is determined that there are more query response items, control passes to 902. In the event it is determined that there are not more query response items, the process ends.

Figure 10:
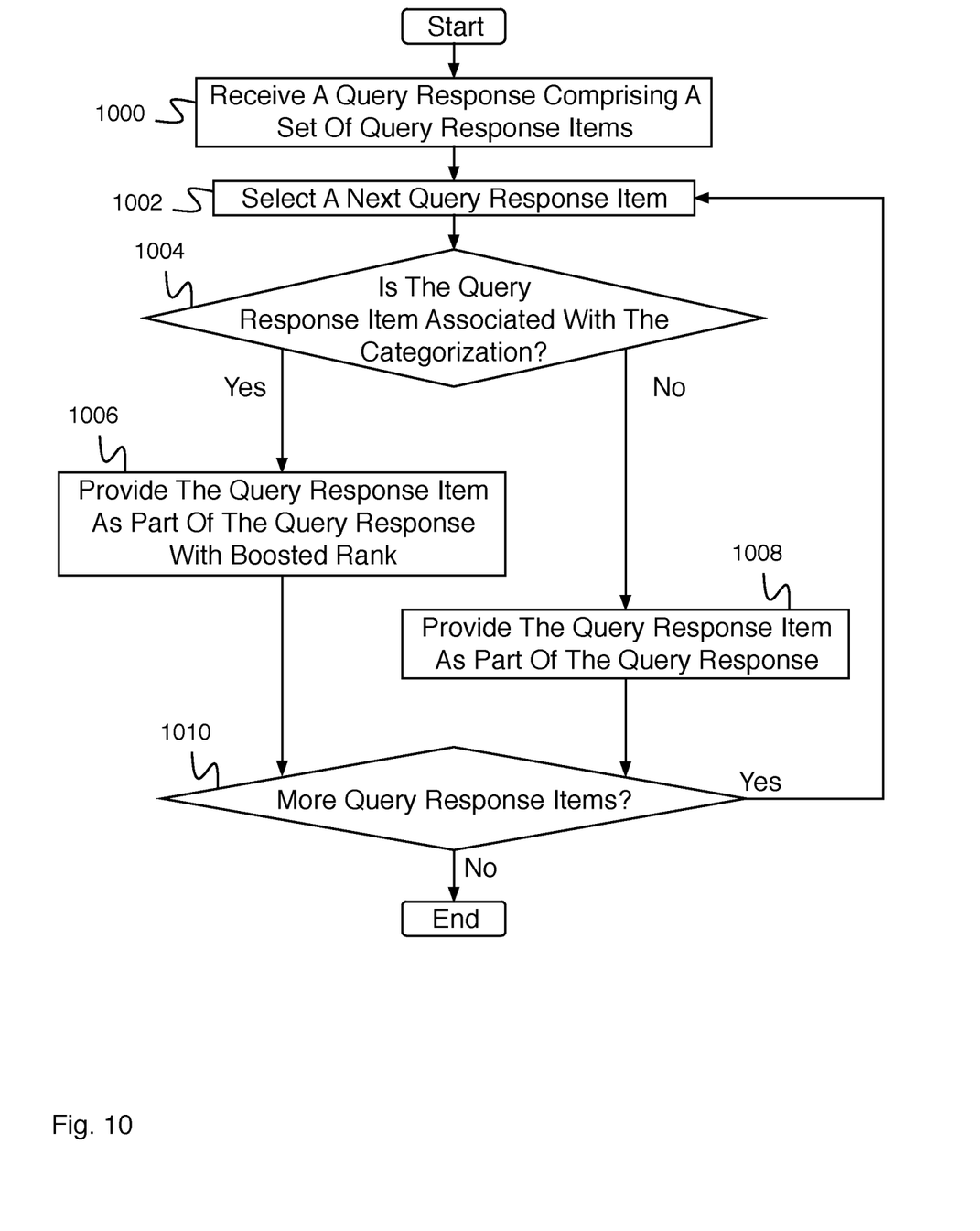
FIG. 10 is a flow diagram illustrating an embodiment of a process for modifying a query response based at least in part on a categorization.

FIG. 10 is a flow diagram illustrating an embodiment of a process for modifying a query response based at least in part on a categorization. In some embodiments, the process of FIG. 10 implements 810 of FIG. 8. In the example shown, in 1000, a query response is received comprising a ranked set of query response items. In 1002, a next query response item is selected. In some embodiments, the next query response item comprises the first query response item. In 1004, it is determined whether the query response item is associated with the categorization. In the event it is determined that the query response item is associated with the categorization, control passes to 1006. In 1006, the query response item is provided as part of the query response with boosted rank. For example the rank of the query response item is boosted by one position in the ranked set of query response items, the rank of the query response item is boosted by two positions in the ranked set of query response items, etc. Control then passes to 1010. In 1004, in the event it is determined that the query response item is not associated with the categorization, control passes to 1008. In 1008, the query response item is provided as part of the query response. For example, the query response item is provided as part of the query response without boosted rank. In 1010, it is determined whether there are more query response items. In the event it is determined that there are more query response items, control passes to 1002. In the event it is determined that there are not more query response items, the process ends.

In some embodiments, boosting of a query response (e.g., as in step 1006 above) in a ranked set of query responses is illustrated by the following example that involves searching documents with three fields: job title, skills, and job description. For simplicity, assume that, generally, each match of the search term in a structured document in each field is awarded 1 point and all the awarded points in the structured document are added up to get a final score. All matching documents are then ranked and displayed by the score, highest to lowest. In this example, a user that is a recruiter is looking for candidates. The recruiter's query searches for 'chef'. Chef can be a job title (e.g., in a restaurant) or a skill (Chef is software DevOps engineers use to manage code deployments). In this case, in determining the categorization, the system determines that the query is associated with the category 'job-title' with a probability 0.6 and with the category 'skill' with a probability 0.4. Thus, the query cannot confidently be categorized as either 'job-title' or 'skill'. However, the query response items or search results can be arranged differently in the ranking—for example, the results that are categorized as a 'job-title' are boosted in the ranking by 6 values, and the results that are categorized as a 'skill' are boosted in the ranking by 4 values. Specifically, search results that include terms more likely to be associated with chef as a job-title (e.g., having a skill of cooking, having a job working at a restaurant, etc.) lead to assigning the likely category of 'job-title' associated with the search result and boosting the search result 6 spots. Search results that include terms more likely to be associated with chef as a skill (e.g., having a job title of DevOps engineer, having a job deploying software in the cloud, etc.) lead to assigning the likely category of 'skill' associated with the search result with the search result and boosting the search result 4 spots. This improves ranking of search results significantly by highlighting matches in relevant fields over others. Without boosting, the search result ranking of the query response items will be less relevant to the user doing the search. The probabilities that categorization determination assigns for a text segment in a search result belonging to a particular category is directly translated into a boosting factor.

Figure 11:
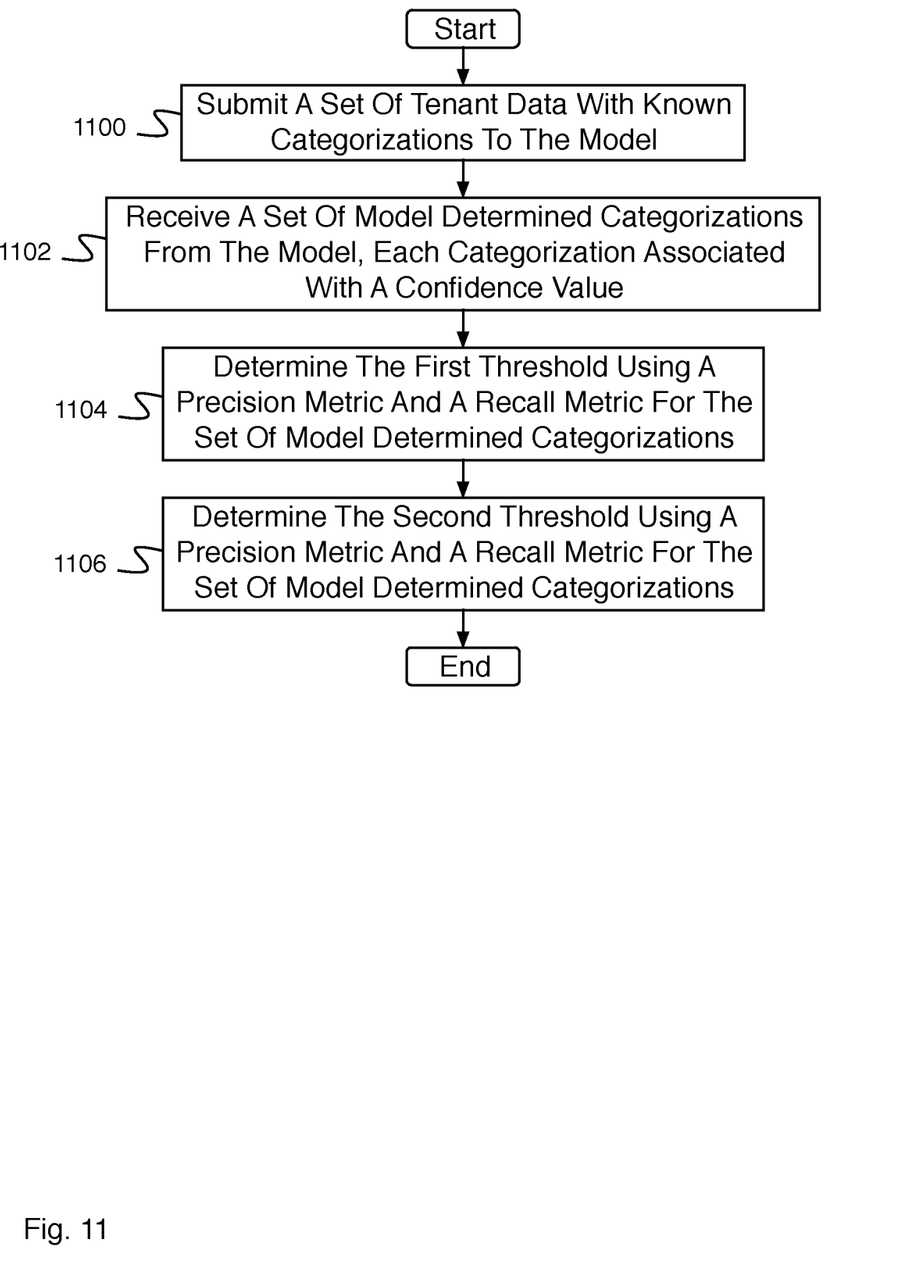
FIG. 11 is a flow diagram illustrating an embodiment of a process for determining thresholds.

FIG. 11 is a flow diagram illustrating an embodiment of a process for determining thresholds. In some embodiments, the process of FIG. 11 is executed by threshold determiner 506 of FIG. 5 for determining a first threshold and a second threshold. In the example shown, in 1100, a set of tenant data with known categorizations is submitted to the model. In 1102, a set of model determined categorizations is received from the model, each categorization associated with a confidence value. In 1104, the first threshold is determined using a precision metric and a recall metric for the set of model determined categorizations. For example, the first threshold is determined to maximize an $F_1$ metric, an $F_{0.1}$ metric, or an $F_{10}$ metric for the set of tenant data. For example, a first threshold is chosen for each category of the set of determined categorizations. In 1106, the second threshold is determined using a precision metric and a recall metric for the set of model determined categorizations. For example, the first threshold is determined to maximize an $F_1$ metric, an $F_{0.1}$ metric, or an $F_{10}$ metric for the set of tenant data. For example, a first threshold is chosen for each category of the set of determined categorizations.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for improving a query response, comprising:
an interface configured to:
receive a query associated with a tenant user of a tenant system; and
a processor configured to:
determine a categorization for the query using a categorization model,
wherein the categorization is associated with a confidence value;
determine a first threshold for the characterization based at least in part on a set of tenant data associated with the tenant user, wherein the set of tenant data associated with the tenant user comprises known characterizations;
determine whether the confidence value is above the first threshold; and
in response to the confidence value being above the first threshold,
modify the query response based at least in part on the categorization;
a memory coupled to the processor and configured to provide the processor with instructions.

2. The system of claim 1, wherein determining the first threshold comprises:
submitting the set of tenant data associated with the tenant user to the categorization model;
receiving a set of model determined categorizations; and
determining the first threshold using a precision metric and a recall metric for the set of model determined categorizations.

3. The system of claim 2, wherein determining the first threshold using a precision metric and a recall metric comprises choosing the first threshold to maximize a metric.

4. The system of claim 2, wherein each model determined categorization of the set of model determined categorizations is associated with a confidence value.

5. The system of claim 1, wherein modifying the query response based at least in part on the categorization comprises filtering the query response using the categorization.

6. The system of claim 1, wherein modifying the query response based at least in part on the categorization comprises modifying the query submitted to a search engine using the categorization.

7. The system of claim 1, wherein the processor is further configured to submit the query to a query engine.

8. The system of claim 1, wherein the first threshold is associated with a categorization.

9. The system of claim 1, wherein the processor is further configured to:

determine a second threshold for the characterization based at least in part on the set of tenant data associated with the tenant user;
determine whether the confidence value is above the second threshold and below the first threshold; and
in response to the confidence value being above the second threshold and below the first threshold, modify the query response based at least in part on the categorization.

10. The system of claim 9, wherein modifying the query response includes reranking the query response using the categorization.

11. The system of claim 9, wherein modifying the query response includes raising responses in a ranking that are associated with the categorization.

12. The system of claim 9, wherein determining the second threshold comprises:
submitting the set of tenant data associated with the tenant user to the categorization model;
receiving a set of model determined categorizations; and
determining the second threshold using the precision metric and the recall metric for the set of model determined categorizations.

13. The system of claim 12, wherein determining the second threshold using the precision metric and the recall metric comprises choosing the second threshold to maximize an $F_1$ metric.

14. The system of claim 12, wherein each model determined categorization of the set of model determined categorizations is associated with a confidence value.

15. The system of claim 9, wherein the second threshold is associated with a categorization.

16. A method for improving a query response, comprising:
receiving a query associated with a tenant user of a tenant system;
determining, using a processor, a categorization for the query using a categorization model,
wherein the categorization is associated with a confidence value;
determining a first threshold for the characterization based at least in part on a set of tenant data associated with the tenant user, wherein the set of tenant data associated with the tenant user comprises know characterizations;
determining whether the confidence value is above the first threshold; and
in response to the confidence value being above the first threshold,
modifying the query response based at least in part on the categorization.

17. A computer program product for improving a query response, the computer program product being embodied in a non-transitory computer readable storage medium and comprising computer instructions for:
receiving a query associated with a tenant user of a tenant system;
determining a categorization for the query using a categorization model,
wherein the categorization is associated with a confidence value;
determining a first threshold for the characterization based at least in part on a set of tenant data associated with the tenant user, wherein the set of tenant data associated with the tenant user comprises know characterizations;
determining whether the confidence value is above the first threshold; and in response to the confidence value being above the first threshold,
modifying the query response based at least in part on the categorization.

* * * * *

UNITED STATES PATENT AND TRADEMARK OFFICE
CERTIFICATE OF CORRECTION

PATENT NO. : 10,896,185 B1  
APPLICATION NO. : 15/966240  
DATED : January 19, 2021  
INVENTOR(S) : Parag Avinash Namjoshi et al.

Page 1 of 1

It is certified that error appears in the above-identified patent and that said Letters Patent is hereby corrected as shown below:

In the Specification

In Column 5, Line(s) 11, delete "'Python'" and insert --'Python'--, therefor.

In Column 5, Line(s) 56, delete "'Python'" and insert --'Python'--, therefor.

Signed and Sealed this  
Thirty-first Day of August, 2021

Drew Hirshfeld  
*Performing the Functions and Duties of the*  
*Under Secretary of Commerce for Intellectual Property and*  
*Director of the United States Patent and Trademark Office*